United States Patent [19]
Ault

[11] 4,309,768
[45] Jan. 5, 1982

[54] MISMATCH DETECTION CIRCUIT FOR DUPLICATED LOGIC UNITS

[75] Inventor: Cyrus F. Ault, Wheaton, Ill.

[73] Assignee: Bell Telephone Laboratories, Incorporated, Murray Hill, N.J.

[21] Appl. No.: 108,660

[22] Filed: Dec. 31, 1979

[51] Int. Cl.³ ............................................. G06F 11/16
[52] U.S. Cl. ...................................... 371/68; 307/441
[58] Field of Search ......................... 371/68, 69, 70; 307/204, 219; 340/146.2; 364/741

[56] References Cited

U.S. PATENT DOCUMENTS

| | | | |
|---|---|---|---|
| 2,994,062 | 7/1961 | Chiapuzio, Jr. et al. | 340/149 |
| 3,078,039 | 2/1963 | Anderson | 364/741 |
| 3,337,849 | 8/1967 | Lowry | 371/68 |
| 3,471,686 | 10/1969 | Connell | 371/68 |
| 3,585,377 | 6/1971 | Jessep | 371/14 |
| 4,215,340 | 7/1980 | Lejon | 307/204 |

*Primary Examiner*—Charles E. Atkinson
*Attorney, Agent, or Firm*—William H. Kamstra; Peter Visserman

[57] ABSTRACT

A detection circuit for detecting a mismatch between the output signals of duplicated logic units (10a, 10b). The output terminals of one of the duplicated logic units are correspondingly connected to the output terminals of the other duplicated logic unit, while the power supply leads of the duplicated logic units (10a, 10b) are connected to a positive voltage source (32) through a current imbalance detector. Any mismatch between the output signals of the duplicated logic units (10a, 10b) will result in the detection of a large imbalance of current being supplied to the duplicated logic units (10a, 10b). Upon detection, the detector will generate an error signal.

15 Claims, 1 Drawing Figure

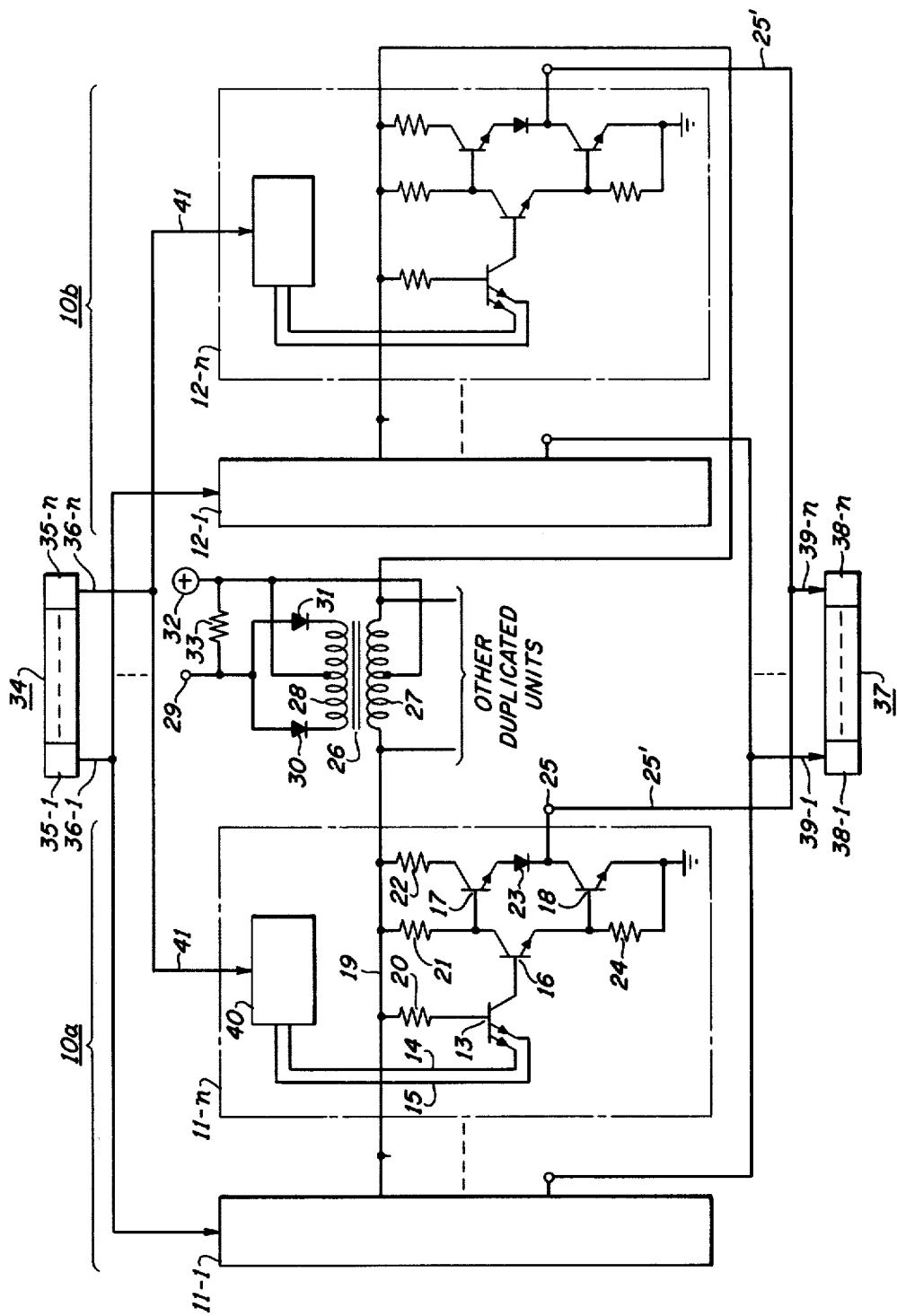

MISMATCH DETECTION CIRCUIT FOR DUPLICATED LOGIC UNITS

BACKGROUND OF THE INVENTION

This invention relates generally to data processing systems, and, more particularly, to the detection of processing errors or malfunctions in duplicated logic units.

One of the most comprehensive schemes for detecting processing errors or malfunctions in data processing systems involves duplicating the data processing control units, running the two units in parallel with the same inputs, and comparing the two outputs for identity with bit-by-bit matching circuitry. If the data thus obtained does not match, either different input data was received by the units or one of the units is not operating properly.

In a processing arrangement employing duplicated processing units, it is imperative that processing errors or malfunctions in either processing unit are detected immediately upon their occurrence. Immediate error detection facilitates timely diagnosis of processing errors or malfunctions and permits appropriate action to be taken before spurious system control operations occur. Bit-by-bit matching provides a complete and accurate method of detection, but is slow to react due to the extensive matching circuitry required.

Today, many data processing systems utilize positive-voltage, transistor-transistor logic. With a positive source voltage of approximately 5.0 volts, a high voltage (binary "1") is a positive voltage of approximately 3.6 volts; while a low voltage (binary "0") is as near to zero volts as the saturation voltage of the collector-to-emitter structure of a transistor will allow, typically +0.2 volts. No matter what kind of electronic circuits are used to build data processing systems, the basic digital building blocks are very similar from system to system. In transistor-transistor logic, the NAND gate is the basic building block. With the basic gate, counters, flipflops, shift-registers, and other circuits can be built. These, in turn, are used to build the desired data processing system. The basic NAND gate comprises an input stage and an output stage, the latter being arranged to provide a source of and a sink for current for a given load. These characteristics, when utilized with appropriately connected, duplicated logic units, according to the principles of this invention, allows a current imbalance to be detected between mismatched units.

It is an objective of this invention to provide an immediate detection of a mismatch caused by processing errors or malfunctions between duplicated logic units while utilizing the output stage of the NAND gate. Where the data processing system uses transistor-transistor logic, the detection circuit of this invention can economically take advantage of the characteristic of the output stage of the already present gates.

SUMMARY OF THE INVENTION

The advantages of this invention are achieved in one illustrative embodiment thereof by correspondingly connecting the output terminals of duplicated transistor-transistor logic units receiving simultaneous input data, while the voltage source lead of the units is connected to a positive voltage source through a current imbalance detector. Any mismatch between the duplicated logic units, for example, a processing error or malfunction in either one, will result in a large current imbalance being sensed by the detector. Upon detection of a mismatch, the detector will generate a signal for other circuitry to perform diagnostic or correctional action.

BRIEF DESCRIPTION OF THE DRAWING

The organization and operation of a mismatch detection circuit for duplicated logic units according to the principles of this invention will be better understood from a consideration of the detailed description of one specific illustrative embodiment thereof which follows when taken in conjunction with the accompanying drawing in which a single figure depicts in combinational block and circuit diagram form one illustrative mismatch detection circuit for duplicated logic units according to the principles of this invention.

DETAILED DESCRIPTION

Depicted in the single figure of the drawing is an illustrative mismatch detection circuit according to the invention shown as including the output stages of the corresponding cells of a representative pair of duplicated arithmetic and logic units 10a and 10b. Typically, units 10a and 10b each comprises an identical plurality of individual logic cells 11-1, ... 11-n and 12-1, ... 12-n, respectively. Corresponding cells of units 10a and 10b perform the same predetermined logic operations and their circuit details are identically organized. Others of the corresponding cells of units 10a and 10b, although identically organized, may or may not perform the same logic operations, however. Thus, for example, cells 11-1 and 11-n and corresponding cells 12-1 and 12-n of units 10a and 10b, respectively, may perform different logic operations and have for the most part dissimilar circuit organization. Each of the cells of both units 10a and 10b have identical transistor-transistor logic output stages, the details of which are shown in corresponding cells 11-n and 12-n. Since these details are identical, a description of the circuit organization of only the output stage of cell 11-n need be considered for an understanding of the invention. The circuit organization for performing logic operations preceding and succeeding those of the duplicated units 10a and 10b will be considered hereinafter followed by a description of illustrative operations of the mismatch detection circuit of the invention.

The transistor-transistor logic output stage, effectively a NAND gate, of representative cell 11-n comprises an input NPN transistor 13 having multiple emitters connected to input leads 14 and 15. The collector of transistor 13 is connected to the base of a second NPN transistor 16 having its collector and emitter connected to a "totem-poled" output stage comprising a pair of NPN transistors 17 and 18. The bases of transistors 13 and 17 as well as the collector of the latter are connected to a voltage source lead 19 through resistors 20, 21 and 22, respectively. Transistors 17 and 18 present a current path between lead 19 and ground through the emitter of transistor 17, a diode 23, and the emitter of transistor 18, the base of the latter also being connected to ground through a resistor 24. An output terminal 25 is connected at one end to the junction of diode 23 and the collector of transistor 18. A connecting lead 25' connects the output terminal 25 to the identical output terminal in the circuitry of cell 12-n of unit 10b.

The final stage of the mismatch detection circuit of the invention comprises a transformer 26 having a center-tapped primary winding 27, the ends of which are connected to the ends of voltage source lead 19 of unit 10a and an identical lead of unit 10b. A center-tapped secondary winding 28 of transformer 26 is connected to an error terminal 29 through respective diodes 30 and 31. The center taps of windings 27 and 28 as well as error terminal 29 are connected to a positive voltage source 32, the latter through a resistor 33.

With the foregoing organization of an illustrative mismatch detection circuit according to the invention in mind, the circuit organization for performing logic operations preceding and succeeding those of the duplicated units 10a and 10b may now be considered. Typically, an input unit 34 preceding units 10a and 10b contains a plurality of individual cells 35-1, . . . 35-n, corresponding to the corresponding cells of units 10a and 10b, the cells of unit 34 having output conductors 36-1, . . . 36-n, respectively. Thus, for example, the n cells of input unit 34 may be a combination of sequential and combinational logic or some other logic circuitry as is known in the art. Typically, a load unit 37 succeeds units 10a and 10b which load unit also contains a plurality of individual cells 38-1, . . . 38-n, corresponding to the corresponding cells of units 10a and 10b, the cells of unit 37 having input conductors 39-1, . . . 39-n, respectively. Thus, for example, the n cells of load unit 37 may also be a combination of sequential and combinational logic or some other logic circuitry as is known in the art. Each cell of load unit 37 also transmits and receives current over its input conductor.

A description of illustrative operations of the mismatch detection circuit of the invention in conjunction with operations preceding and succeeding those of the duplicated units 10a and 10b may now be addressed. Since the corresponding cells of units 10a and 10b perform the same predetermined logic operations, and their circuit details are identically organized, a description of the logic operation of only corresponding cells 11-n and 12-n, cells 35-n of input unit 34, and cell 38-n of load unit 37 need be considered for an understanding of the invention. Typically, a high voltage signal representing a binary "1" or a low voltage signal representing a binary "0" is transmitted by each cell of input unit 34 and is simultaneously received by the corresponding cells of units 10a and 10b; other signals may or may not be simultaneously transmitted by others of the cells of input unit 34 and simultaneously received by others of the corresponding cells of units 10a and 10b. Corresponding cell 11-n typically comprises the aforementioned output stage and a logic circuit 40 having an input and having outputs connected to input leads 14 and 15 of the output stage. A conductor 41 also connects the input of circuit 40 and a corresponding input in cell 12-n to output lead 36-n. Logic circuit 40, together with the output stage, typically performs the predetermined logic operation of cell 11-n. In response to the receipt of a high or low voltage signal, circuit 40 transmits a high or low voltage signal on each of the input leads 14 and 15. With both of the leads 14 and 15 at high voltage, the collector of transistor 13 will be at high voltage; whereas, if either of the leads 14 or 15 are at low voltage, the collector of transistor 13 will be at low voltage. Since corresponding cells 11-n and 12-n are identically organized, perform the same predetermined logic operation, and simultaneously receive signals, in the normal case, that is, in the absence of a processing error or a malfunction in corresponding cells 11-n and 12-n at a point prior to the bases of transistor 16 and the corresponding transistor of cell 12-n, respectively, a match condition will result with the same voltage, high or low, being present at the base of transistor 16 and its corresponding transistor. On the other hand, the presence of a processing error or a malfunction in either of corresponding cells 11-n or 12-n at a point prior to the bases of transistor 16 and the corresponding transistor of cell 12-n, respectively, results in a mismatch condition with different voltages being present at the base of transistor 16 and its corresponding transistor. Accordingly, two operational descriptions, one an illustrative normal operation and the other an illustrative mismatch detection operation, of the mismatch detection circuit of the invention will be considered. The circuit of the invention is not concerned with a processing error or a malfunction occurring subsequent to the point prior to the bases of transistor 16 and the corresponding transistor of cell 12-n and assumes the proper functioning of the circuitry between the point prior to the base of transistor 16 and output lead 25' and the corresponding circuitry of cell 12-n.

With the foregoing in mind, a description of an illustrative normal operation of the mismatch detection circuit of the invention assuming a low voltage simultaneously present at the bases of transistor 16 and its corresponding transistor may now be considered. With its base at low voltage, the collector-to-emitter impedance of transistor 16 is high with little, if any, current flowing from the collector to the emitter of transistor 16. The voltage then applied to the base of transistor 18 is close to zero; accordingly, the collector-to-emitter impedance of transistor 18 is also high, thereby acting as an open circuit. With the base of transistor 16 at low voltage, the collector voltage of transistor 16 and the base voltage of transistor 17 will be close in value to that of the positive voltage source 32 thereby enabling transistor 17 to conduct current through its collector-to-emitter junction. As a result, a very small current, as was found in the practice of the invention, flows from positive voltage source 32 through one portion of primary winding 27, lead 19, resistor 22, the collector-to-emitter junction of transistor 17, diode 23, output lead 25', and input conductor 39-n into cell 38-n of load unit 37. Thus, transistor 17 and its corresponding transistor share the task of providing a source of current to cell 38-n of load unit 37 while actively pulling up the voltage at output terminal 25 to a high level, two characteristics of the TTL "totem-poled" output stage being utilized in this invention. Primary winding 27 is wound such that, with equal amounts of current flowing in both portions of the winding, zero or near zero voltage is induced in secondary winding 28. With zero voltage across secondary winding 28, diodes 30 and 31 do not conduct; therefore, the voltage at error terminal 29 is near that of positive voltage source 32. Typically, other logic circuitry performing corrective or diagnostic action as is known in the art is connected to error terminal 29; the value of resistor 33 is selected to hold error terminal 29 at positive voltage. Thus, with the bases of transistor 16 and its corresponding transistor both at low voltage, a high voltage present on error terminal 29 indicates the absence of a processing error or a malfunction in corresponding cells 11-n and 12-n prior to transistor 16 and its corresponding transistor.

A description of an illustrative normal operation of the mismatch detection circuit of the invention assuming a high voltage simultaneously present at the bases of transistor 16 and its corresponding transistor may now be addressed. With its base at high voltage, the emitter voltage of transistor 16 will rise; and the collector voltage will fall from its near positive voltage source 32 value. The values of resistors 21 and 24 are selected so that when transistor 16 is conducting, the base voltage of transistor 18 is high enough to effect its conduction and the base voltage of transistor 17 is low enough to effect its cutoff. With transistor 18 conducting and transistor 17 cut off, the voltage at output terminal 25 is near zero with little, if any, current flowing from the collector to the emitter of transistor 17. As a result, current flows from positive voltage source 32 through one portion of winding 27, lead 19, resistor 21, the collector-to-emitter junction of transistor 16, and resistor 24 to ground. With equal amounts of current once again flowing in both portions of primary winding 27, the voltage at error terminal 29 when connected to other logic circuitry is once again high. Accordingly, with the bases of transistor 16 and its corresponding transistor now both at high voltage, a high voltage present at error terminal 29 once again indicates the absence of a processing error or a malfunction in corresponding cells 11-n and 12-n prior to transistor 16 and its corresponding transistor. In addition, another small current, on the order of 1.0 milliampere, as was found in the practice of the invention, also flows from cell 38-n of load unit 37 through input conductor 39-n, output lead 25' and equally through transistor 16 and its corresponding transistor to ground. Thus, transistor 18 and its corresponding transistor also share the task of providing a sink for current to flow from cell 38-n of load unit 37 while actively pulling down the voltage at output terminal 25 to a near zero level.

With the description of an illustrative normal operation of the mismatch detection circuit of the invention completed, attention is now focused on a description of an illustrative mismatch detection operation, first, with a low voltage on the base of transistor 16 and a high voltage on the base of its corresponding transistor and, secondly, with a high voltage on the base of transistor 16 and a low voltage on the base of its corresponding transistor. First, with the base of transistor 16 at low voltage and the base of corresponding transistor 16 at high voltage, indicative of a mismatch condition, a large current, on the order of 100 milliampere as was found in the practice of the invention, flows from positive voltage source 32 through one portion of primary winding 27, lead 19, resistor 22, the collector-to-emitter junction of transistor 17, diode 23, output lead 25', and the collector-to-emitter junction of the corresponding transistor to transistor 18 to ground. With a large current flowing in just one portion of primary winding 27, one portion of secondary winding 28 is wound in a manner with respect to primary winding 27 such that a voltage is induced across the one portion of secondary winding 28 sufficient to cause a zero or near zero voltage representing a binary "0" to be present on error terminal 29. Accordingly, one of the two diodes 30 or 31 will conduct current with the other diode remaining nonconductive. Thus, with the base of transistor 16 at low voltage and the base of its corresponding transistor at high voltage, a low voltage present on error terminal 29 indicates the presence of a processing error or a malfunction in either corresponding cells 11-n or 12-n prior to transistor 16 and its corresponding transistor.

Secondly, with the base of transistor 16 at high voltage and the base of its corresponding transistor at low voltage, also resulting from a mismatch condition, another large current flows in a similar manner from positive voltage source 32 through the other portion of primary winding 27; the corresponding items of lead 19, resistor 22, the collector-to-emitter junction of transistor 17, and diode 23; output lead 25', and the collector-to-emitter junction of transistor 18 to ground. The other portion of secondary winding 28 is also wound in a manner such that a voltage is induced across it sufficient to cause a zero or near zero voltage to be present on error terminal 29. One of the two diodes 30 or 31 will not conduct current with the other diode now conducting. Thus, with the base of transistor 16 at high voltage and the base of its corresponding transistor at low voltage, a low voltage present on error terminal 29 indicates the presence of a processing error or a malfunction in corresponding cells 11-n or 12-n prior to transistor 16 and its corresponding transistor.

Since the cells of units 10a and 10b all receive voltage and current via primary winding 27 in a similar fashion, any mismatch condition between corresponding cells of units 10a and 10b causes the presence of a low voltage on error terminal 29.

Although only a single pair of duplicated units was described as sufficient for a complete understanding of the invention, it will be appreciated that additional duplicated units may also be connected in a similar fashion to the ends of primary winding 27 to indicate the presence of a mismatch condition in their corresponding cells. Accordingly, what has been described is considered to be only one specific illustrative mismatch detection circuit according to the invention and it is to be understood that various and numerous other arrangements may be devised by one skilled in the art without departing from the spirit and scope of the invention as limited only by the accompanying claims.

What is claimed is:

1. A detection circuit for detecting a mismatch between the output signals of a first and a second plurality of logic units (11-1, ... 11-n; 12-1 ... 12-n), each of the logic units of said first plurality of logic units (11-1, ... 11-n) having a corresponding logic unit in said second plurality of logic units (12-1, ... 12-n), each of said logic units comprising a logic circuit for performing a predetermined logic operation, an output circuit stage comprising an output terminal for supplying said output signals, a power supply circuit, and switch means controlled responsive to said logic operation for selectively connecting said output terminal to either said power supply circuit or ground, said detection circuit being characterized in circuit means for connecting the power supply circuits of the output circuit stages of the logic units of said first and second plurality of logic units (11-1, ... 11-n; 12-1, ... 12-n) to a power supply (32), connecting circuit means for connecting the output terminals of the output circuit stages of the logic units of said first plurality of logic units (11-1, ... 11-n) to the output terminals of the output circuit stages of the corresponding logic units of said second plurality of logic units (12-1, ... 12-n) to complete in said logic units a circuit path including said power supply circuit and said switch means when controlled to connect said output terminal to said power supply circuit of one logic unit and said switch means of the other corresponding logic unit when controlled to connect said output terminal to ground, and being further characterized in detection circuit means connected across said circuit means for detecting current flow in each of said circuit paths and for generating an error signal indicative of said current flow.

2. A detection circuit for detecting a mismatch between the output signals of a first and a second logic unit (11-n, 12-n), each of said units comprising a logic circuit for performing a predetermined logic operation, an output circuit stage comprising an output terminal for supplying said output signals, a power supply circuit, and switch means controlled responsive to said logic operation for selectively connecting said output terminal to either said power supply circuit or ground, said detection circuit being characterized in circuit means for connecting the power supply circuits of the output circuit stages of said first and said second logic units (11-n, 12-n) to a power supply (32), connecting circuit means for connecting the output terminal of the output circuit stage of said first logic unit (11-n) to the output terminal of the output circuit stage of said second logic unit (12-n) to complete in said logic units a circuit path including said power supply circuit and said switch means when controlled to connect said output terminal to said power supply circuit of one logic unit and said switch means of the other logic unit when controlled to connect said output terminal to ground, and being further characterized in detection circuit means connected across said circuit means for detecting current flow in each of said circuit paths and for generating an error signal indicative of said current flow.

3. A detection circuit for detecting a mismatch between the output signals of a first and a second plurality of logic units (11-1, . . . 11-n; 12-1, . . . 12-n), each of the logic units of said first plurality of logic units (11-1, . . . 11-n) having a corresponding logic unit in said second plurality of logic units (12-1, . . . 12-n), each of said logic units comprising a logic circuit for performing a predetermined logic operation, an output circuit stage comprising an output terminal for supplying said output signals, a power supply circuit, and switch means controlled responsive to said logic operation for selectively connecting said output terminal to either said power supply circuit or ground, said detection circuit being characterized in a transformer (26) having a primary winding (27) and a secondary winding (28), each of said windings having a center tap, circuit means for connecting said center taps to a power supply (32), the power supply circuits of the output circuit stages of the logic units of said first and said second plurality of logic units (11-1, . . . 11-n; 12-1, . . . 12-n) being connected to respective ends of said primary winding (27), connecting circuit means for connecting the output terminals of the output circuit stages of the logic units of said first plurality of logic units (11-1, . . . 11-n) to the output terminal of the output circuit stages of the corresponding logic units of said second plurality of logic units (12-1, . . . 12-n) to complete in said logic units a circuit path including a portion of said primary winding (27), said power supply circuit and said switch means when controlled to connect said output terminal to said power supply circuit of one logic unit, and said switch means of the other corresponding logic unit when controlled to connect said output terminal to ground, and being further characterized in detection circuit means connected across the ends of said secondary winding (28) for detecting current flow in each of said circuit paths and for generating an error signal indicative of said current flow.

4. A detection circuit for detecting a mismatch between the output signals of a first and a second logic unit (11-n, 12-n), each of said units comprising a logic circuit for performing a predetermined logic operation, an output circuit stage comprising an output terminal for supplying said output signals, a power supply circuit, and switch means controlled responsive to said logic operation for selectively connecting said output terminal to either said power supply circuit or ground, said detection circuit being characterized in a transformer (26) having a primary winding (27) and a secondary winding (28), each of said windings having a center tap, circuit means for connecting said center taps to a power supply (32), said power supply circuits of said units being connected to respective ends of said primary winding (27), connecting circuit means for connecting said output terminals to complete in said units a circuit path including a portion of said primary winding (27), said power supply circuit and said switch means when controlled to connect said output terminal to said power supply circuit of one logic unit, and said switch means of the other logic unit when controlled to connect said output terminal to ground, and being further characterized in detection circuit means connected across the ends of said secondary winding (28) for detecting current flow in each of said circuit paths and for generating an error signal indicative of said current flow.

5. A detection circuit as claimed in claim 1, 2, 3, or 4 further characterized in that said switch means comprises a first and a second transistor, said first transistor having its collector connected to said power supply circuit, said second transistor having its collector connected to the emitter of said first transistor and to said output terminal and its emitter connected to ground, and a drive means controlled responsive to said predetermined logic operation and connected to the bases of said first and second transistor for controlling the operation of said first and second transistor so that only one conducts at any given time.

6. A detection circuit as claimed in claim 5, further characterized in that said drive means comprises a third transistor having its collector connected to the base of said first transistor and to said power supply circuit, its emitter connected to the base of said second transistor and to ground, and its base controlled responsive to said predetermined logic operation for controlling the operation of said first and second transistor.

7. A detection circuit as claimed in claim 3 or 4 further characterized in that said detection circuit means comprises a first and a second diode (30, 31) connected together and to respective ends of said secondary winding (28).

8. An electrical logic system comprising a transformer (26) having a primary winding (27) and a secondary winding (28), each of said windings having a center tap, power supply circuit means connected to said center taps, a first and a second plurality of logic units (11-1, . . . 11-n; 12-1, . . . 12-n), each of the logic units of said first plurality of logic units (11-1, . . . 11-n) having a corresponding logic unit in said second plurality of logic units (12-1, . . . 12-n), each of said logic units comprising a logic circuit having an output terminal for generating a predetermined logic output signal on said output terminal responsive to a predetermined logic input signal, said logic circuit including a first and second switch means connected on either side of said output terminal selectively energized to connect said output terminal to one end of said primary winding and ground, respectively, as determined by said logic input signal; a plurality of connecting circuit means for connecting the output terminals of the logic circuits of the logic units of said first plurality of logic units (11-1, ... 11-n) to the output terminals of the logic circuits of respective corresponding logic units of said second plurality of logic units (12-1, ... 12-n) to complete a mismatch circuit path for said logic units comprising said power supply circuit means, a portion of said primary winding (27), said first switch means, and said second switch means of the logic circuit of the corresponding logic unit of the other plurality of logic units; and detection circuit means coupled to the ends of said secondary winding (28) for generating an output signal indicative of the presence of current flow in any of said mismatch circuit paths.

9. An electrical logic system comprising a transformer (26) having a primary winding (27) and a secondary winding (28), each of said windings having a center tap, power supply circuit means connected to said center taps, a first and a second logic unit (11-n, 12-n) each comprising a logic circuit having an output terminal for generating a predetermined logic output signal on said output terminal responsive to a predetermined logic input signal, said logic circuit including a first and a second switch means connected on either side of said output terminal selectively energized to connect said output terminal to one end of said primary winding and ground, respectively, as determined by said logic input signal; connecting circuit means for connecting said output terminals of the logic circuits of said first and second logic units (11-n, 12-n) to complete a mismatch circuit path for said units comprising said power supply circuit means, a portion of said primary winding (27), said first switch means, and said second switch means of the other logic unit; and detection circuit means coupled to the ends of said secondary winding (28) for generating an output signal indicative of the presence of current flow in either of said mismatch circuit paths.

10. An electrical logic system as claim in claim 8 or 9 in which said logic circuits each comprises a NAND logic circuit.

11. An electrical logic system as claimed in claim 8 or 9 in which said first and second switch means each comprises a transistor.

12. An electrical logic system as claimed in claim 8 or 9 in which said detection circuit means comprises a first and second diode (30, 31) connected together and to respective ends of said secondary winding (28).

13. A detection circuit for detecting a mismatch between the output signals of a first and a second logic unit, each of said units having an output terminal, a logic circuit for performing a predetermined logic operation, and an output circuit stage connected to said logic circuit for supplying said output signals at said output terminal, each of said output circuit stages having a power supply circuit;

said detection circuit comprising:

circuit means for connecting said power supply circuits to a power supply terminal connectible to a power supply;

connecting means for interconnecting said output terminals; and detection means coupled to said circuit means for comparing current magnitudes in said power supply circuits and for generating an error signal indicative of differences in said current magnitudes, whereby said differences occur when there is a mismatch between the output signals of said logic units.

14. A detection circuit as claimed in claim 13 in which said circuit means comprises a transformer having a primary winding and a secondary winding, each of said windings having a center tap connected to said power supply terminal, one end of said primary winding being connected to the power supply circuit of said first logic unit, the other end of said primary winding being connected to the power supply of said second logic unit.

15. A detection circuit as claimed in claim 14 in which said detection means comprises a first and a second diode connected together and to the respective ends of said secondary winding.

* * * * *